United States Patent
Lee

[11] Patent Number: 5,256,284
[45] Date of Patent: Oct. 26, 1993

[54] PLASTIC ELECTRIC FUEL INJECTION FILTER ASSEMBLY AND A WELDING METHOD FOR THE PREPARATION THEREOF

[76] Inventor: Albert Lee, 232 Margate Rd., Timonium, Md. 21093

[21] Appl. No.: 850,435

[22] Filed: Mar. 12, 1992

[51] Int. Cl.⁵ ............................................. B01D 27/08
[52] U.S. Cl. .................................. 210/232; 210/446; 156/73.5
[58] Field of Search ............... 210/438, 439, 446, 448, 210/449, 493.4, 497.1, 232; 156/73.5, 73.6; 285/158, 184, 185, 190

[56] References Cited

U.S. PATENT DOCUMENTS

| | | | |
|---|---|---|---|
| 3,002,870 | 10/1961 | Belgarde et al. | 210/232 |
| 4,824,304 | 4/1989 | Shibayama et al. | 156/73.5 |
| 4,933,079 | 6/1990 | Kroha | 210/446 |
| 5,137,166 | 8/1992 | Unger et al. | 156/73.5 |

FOREIGN PATENT DOCUMENTS

| | | | |
|---|---|---|---|
| 234108 | 8/1959 | Australia | 210/446 |
| 878851 | 10/1961 | United Kingdom | 210/446 |

Primary Examiner—Matthew O. Savage
Attorney, Agent, or Firm—Birch, Stewart, Kolasch & Birch

[57] ABSTRACT

A plastic EFI filter assembly includes a plurality of holding stoppers disposed on a main body and a lid for tightly holding both the main body and lid together, and a universal inlet receptacle and a universal outlet receptacle for mating with an inlet pipe line and an outlet pipe line, respectively. The plastic oil filter assembly is simple in construction, inexpensive to manufacture, durable in use, and permits one to easily check the contamination level in the filters of the filter member. Furthermore, the plastic oil filter of the present invention allows for recycling of the used plastic filter assembly as a raw material and therefore advantageously reduces waste product pollution.

6 Claims, 2 Drawing Sheets

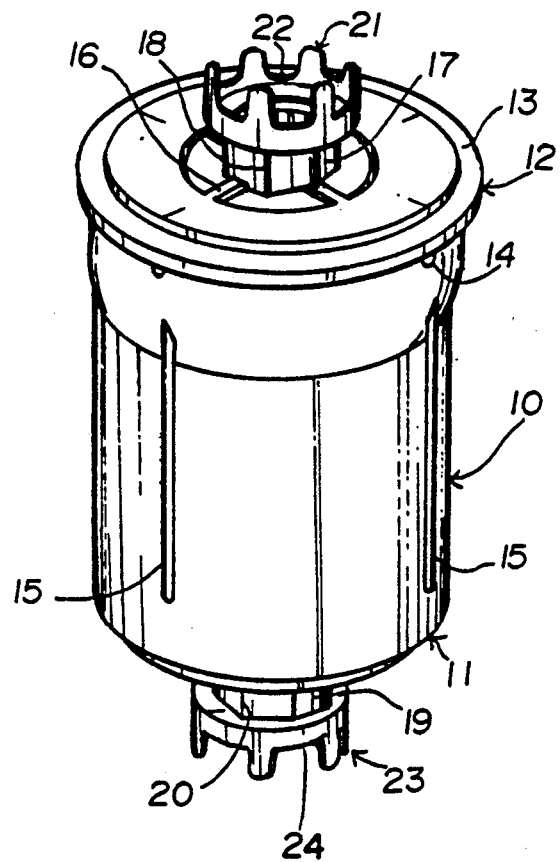
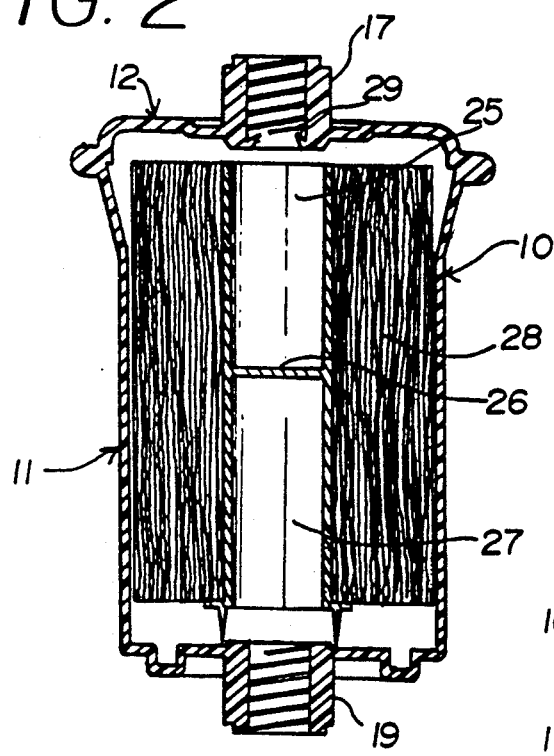
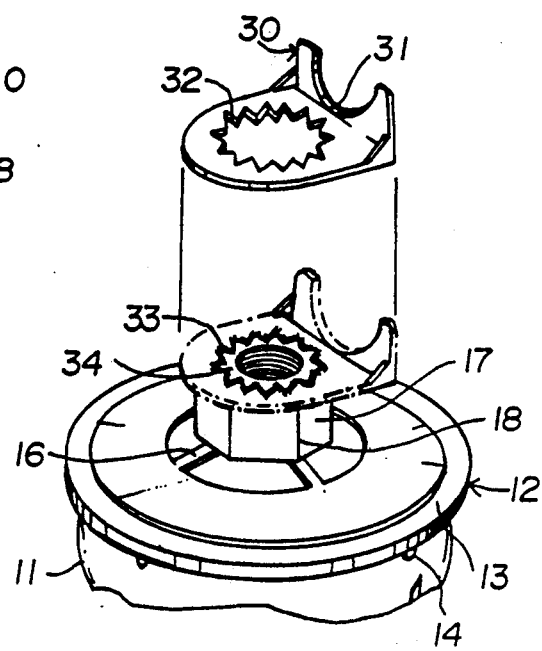

PLASTIC ELECTRIC FUEL INJECTION FILTER ASSEMBLY AND A WELDING METHOD FOR THE PREPARATION THEREOF

BACKGROUND OF THE INVENTION

1. Field of the Invention

The present invention relates to a plastic electric fuel injection (hereinafter "EFI") filter assembly and a method for the preparation thereof, and more particularly, to a replaceable type plastic EFI filter for use in the electric fuel injection systems of an internal combustion engine.

1. Description of the Prior Art

Various types of EFI filters for use in the electric fuel injection systems of internal combustion engines are well known in the art. Such prior EFI filters are made of metal and plastic and therefore possess disadvantages such as, for example, being very complicated in structure, very heavy in weight, cracking during use, and creating a waste disposal problem after use. Furthermore, the user of the prior art filter cannot check the contamination level thereof. Furthermore, it is very difficult for upper and lower pipe receptacles thereof to mate with upper and lower pipe lines.

SUMMARY OF THE INVENTION

Accordingly, it is an object of the present invention to provide a plastic EFI filter assembly which eliminates the above problems encountered with conventional EFI filters.

Another object of the present invention is to provide an improved plastic EFI filter assembly which is provided with a plurality of holding stoppers disposed on a main body and a lid, respectively, for tightly holding both the main body and lid while the body and lid are being welded, and a pair of universal inlet and outlet receptacles, respectively for easily mating the inlet and outlet pipe lines.

A further object of the present invention is to provide a method for the preparation of a plastic EFI filter assembly, which comprises spin welding a main body and a lid by using a plurality of holding stoppers for preventing the EFI filter assembly from cracking.

Yet another object of the present invention is to provide a plastic filter assembly which is simple in construction, inexpensive to manufacture, durable in use, and light in weight.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a plastic EFI filter assembly which includes a plurality of holding stoppers disposed on a main body and a lid for tightly holding both main body and lid together, and a universal inlet receptacle and a universal outlet receptacle for mating an inlet pipe line and an outlet pipe line, respectively. The plastic oil filter assembly is simple in construction, inexpensive to manufacture, durable in use, and permits one to easily check the contamination level in filters of the filter member. Furthermore, since the plastic oil filter of the present invention may be recycled and the used plastic filter assembly reused as a raw material, the present invention allows for advantageous reduction in waste product pollution.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of the plastic EFI filter assembly of the present invention;

FIG. 2 is a sectional view of the plastic EFI filter assembly of the present invention;

FIG. 3 is an exploded perspective view of a universal inlet pipe receptacle of another embodiment of the plastic oil filter assembly of the present invention;

DESCRIPTION OF THE PREFERRED EMBODIMENTS

Figure 4A:
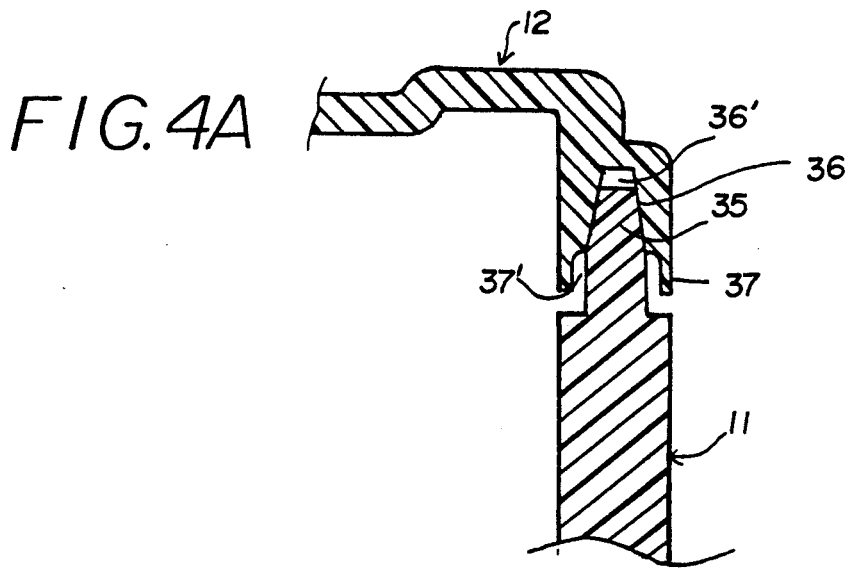
FIG. 4A is a sectional view of each welding portion of a main body and a lid of the present invention.

Referring now in detail to the drawings for the purpose of illustrating preferred embodiments of the present invention, the plastic oil filter assembly 10 as shown in FIGS. 1 and 2 includes a main body member 11 and a lid member 12.

The main body member 11 includes a plurality of stoppers or projections 14 disposed beneath a circumferential raised portion 13 and a plurality of vertical ribs 15 disposed on the outer surface thereof. The stoppers 14 tightly hold the lid and ribs 15 tightly hold the main body member 11 while the main body and lid members 11 and 12 are welded outlet 19 is provided at the base of the main body member 11.

The lid member 12 includes a plurality of solid stoppers or ribs 16 for tightly holding the lid 12 with respect to an inlet 17 while the main body and lid members 11 and 12 are welded.

The inlet 17 includes a plurality of vertical inlet edges 18 and is provided with a universal inlet receptacle 21 having a plurality of inlet slots 22 for selectively receiving an inlet pipe line (not shown). The outlet 19 includes a plurality of vertical outlet edges 20 for retaining the main body member 11 during the welding and is provided with a universal outlet receptacle 23 having a plurality of outlet slots 24 for selectively receiving an outlet pipe line (not shown). Both inlet and outlet receptacles 21 and 23, respectively, can be attached to the inlet and outlet 17 and 19, respectively, in a conventional securing manner, i.e. screwing, adhering, etc.

As shown in FIG. 2, the EFI filter assembly 10 includes an upper stem 25, a partition 26, a lower stem 27, a filter 28, and a an overflowing controller 29 bending upwardly for controlling overflowing gasoline.

FIG. 3 shows an exploded perspective view of a universal inlet receptacle 30 of the second embodiment of the present invention. A universal outlet receptacle of the second embodiment (not shown) of the present invention is the same as the universal inlet receptacle 30. The universal inlet receptacle 30 includes a slot 31 and a plurality of circular gears 32 for selectively mating with a plurality of circular gears 33 disposed on the outer surface of an upper stem 34 of the inlet 34 whereby the gears 32 of the universal receptacle 30 can be fixed to the gears 33 of the inlet 34. Therefore, the slot 31 can easily receive an inlet pipe line (not shown).

As shown in FIGS. 4A to 4D, the main body member 10, 11 and the lid member 12 are welded together using a spin welding method. At this time, during welding, the plurality of stoppers 14 and 16 function as retainers so as to effectively weld the body member 11 and lid 12 to each other. Since the EFI filter assembly 10 is made of Nylon resin spin welding according to the present invention is conducted at a high temperature and a high pressure and therefore produces as one composite unit the EFI filter assembly 10.

As shown in FIG. 4A, in the first embodiment, a gradually tapered smaller circumferential edge 35 of the main body member 11 is engaged with a gradually tapered smaller circumferential groove 36 of the lid member 12. At this time, a space 36' having a trapezoid configuration is formed over the top of the edge 35 and both side spaces 37' are formed around end portions 37 of the lid member 12. Therefore, when the spin welding is operated to bottom main body member 11 and lid member 12, the main body and lid members 11 and 12 become a composite unit which does not crack (FIG. 2).

Figure 4B:
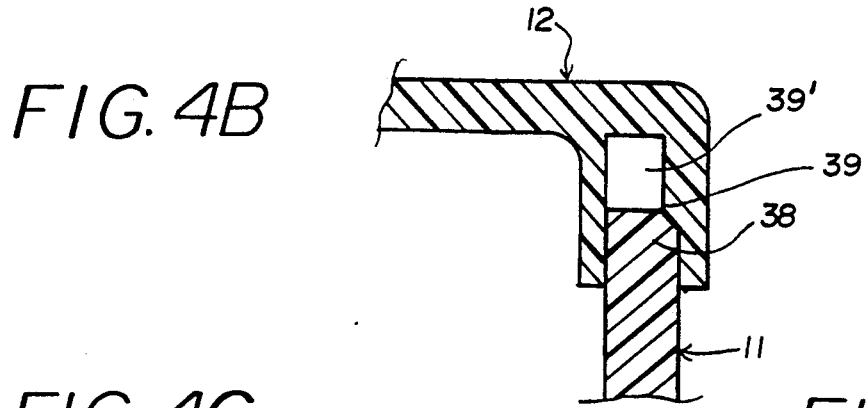
FIG. 4B is a sectional view of each welding portion of a main body and a lid of second embodiment of the present invention.

As shown in FIG. 4B, representing the second embodiment, a gradually tapered smaller circumferential edge 38 of the main body member is engaged with a gradually tapered smaller circumferential groove 39 of the lid member 12. At this time, a space 39' having a rectangular configuration is formed over the top of the edge 38. Therefore, when the spin welding is conducted at the bottom of main body member 11 and lid member 12, the main body and lid members 11 and 12 become a composite unit which does not crack (FIG. 2).

Figure 4C:
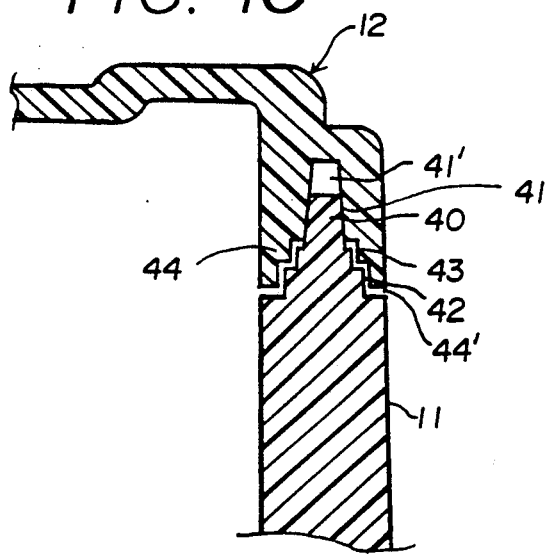
FIG. 4C is a sectional view of each welding portion of a main body and a lid of third embodiment of the present invention.

As shown in FIG. 4C, representing the third embodiment, a gradually tapered smaller circumferential edge 40 of the main body member 11 is engaged with a gradually tapered smaller circumferential groove 41 of the lid member 12. Also, the edge 40 contains a plurality of steps 42 for mating with a plurality of steps 43 of the groove 41'. At this time, a space 41 having a trapezoid configuration is formed over the top of the edge 40 and both side spaces 44' are formed around end portions 44 of the lid member 12. Therefore, when the spin welding is conducted at the bottom of main body member 11 and lid member 12, the main body and lid members 11 and 12 become a composite unit which does not crack (FIG. 2).

Figure 4D:
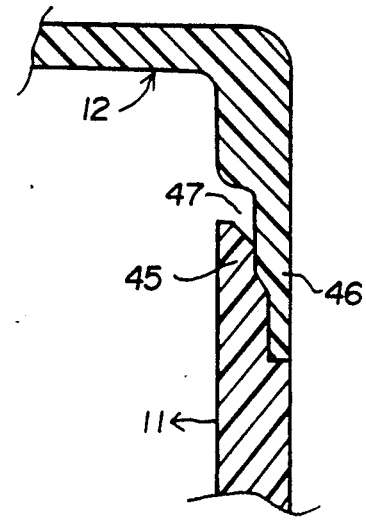
FIG. 4D is a sectional view of each welding portion of a main body and a lid of fourth embodiment of the present invention.

As shown in FIG. 4D, in the fourth embodiment, a one-side gradually tapered smaller circumferential edge 45 of the main body member 11 is engaged with a one-side gradually tapered smaller circumferential groove 46 of the lid member 12. At this time, a space 47 having an opening is formed over the top of the edge 45. Therefore, when the spin welding is conducted between both the main body member 11 and lid member 12, the main body and lid members 11 and 12 become a composite unit which does not crack.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A spin welded plastic electric fuel injection filter assembly for use in the fuel injection system of an internal combustion engine, comprising:
    a main body member having a longitudinal axis, said main body member including an open first end and a second end having an outlet stem formed therein, said main body member having a flange extending about a periphery of said open first end and extending radially outward of said body member relative to said longitudinal axis;
    a filter disposed within said main body member;
    a plurality of projections arranged on a side of said flange facing toward said second end;
    a plurality of elongated first ribs aligned parallel to said longitudinal axis and arranged on an outer peripheral surface of said main body member;
    a lid integrally spin welded to the open first end of said main body member, said lid including an inlet stem formed therein and a plurality of second ribs projecting outwardly from an outer surface of said lid and extending radially outwardly from said inlet stem;
    a plurality of edges formed on an external peripheral surface of said inlet stem, said edges extending in a direction parallel to said axis and
    a universal inlet receptacle fixed to said inlet stem and a universal outlet receptacle fixed to said outlet stem, each of said universal inlet and outlet receptacle including means for selectively receiving an inlet pipe line and an outlet pipe line, respectively; and
    wherein each of said projections and said elongated first ribs provide secure gripping surfaces on said main body and said edges and said second ribs provide secure gripping surfaces on said lid upon counter rotation of said main body with respect to said lid during spin welding.

2. The assembly according to claim 1, wherein the means for selectively receiving of said universal inlet receptacle includes a plurality of slots formed therein for mating with the pipe line, said slots being aligned parallel to said axis.

3. The assembly according to claim 1, wherein the means for selectively receiving of said universal inlet receptacle includes a plurality of gears engageable with corresponding gears of said inlet stem, and a slot extending parallel to said axis for mating with the pipe line.

4. The assembly according to claim 1, wherein the means for selectively receiving of said universal outlet receptacle includes a plurality of gears engagable with corresponding gears of said outlet stem, and a slot extending parallel to said axis for mating with the pipe line.

5. The assembly of claim 1, wherein said outlet stem has an external polygon shape such that a plurality of angular edges extending parallel to said axis provide secure gripping surfaces for said main body during spin welding.

6. The assembly of claim 1, wherein said plurality of edges of said inlet stem are a plurality of angular edges defined by a polygonal shape of said inlet stem.

* * * * *